United States Patent [19] [11] Patent Number: 4,920,206
Behringer et al. [45] Date of Patent: Apr. 24, 1990

[54] PROCESS FOR MAKING AZO PIGMENTS

[75] Inventors: Hartmut Behringer, Erftstadt; Heinrich Rehberg, Hürth, both of Fed. Rep. of Germany

[73] Assignee: Hoechst Aktiengesellschaft, Fed. Rep. of Germany

[21] Appl. No.: 329,953

[22] Filed: Mar. 29, 1989

Related U.S. Application Data

[63] Continuation of Ser. No. 40,295, Apr. 20, 1987, abandoned.

[30] Foreign Application Priority Data

May 3, 1986 [DE] Fed. Rep. of Germany ....... 3615099

[51] Int. Cl.$^5$ ..................... C09B 29/38; C09B 35/08; C09B 37/00; C09B 41/00
[52] U.S. Cl. ................................. 534/582; 534/575; 534/583; 534/739; 534/839; 534/863; 534/876; 534/887
[58] Field of Search ............... 534/582, 739, 583, 863, 534/87 C Primary Examiner—Floyd D. Higel
Attorney, Agent, or Firm—Connolly and Hutz

[57] ABSTRACT

Azo Pigments are made by subjecting a diazo component to an azo coupling reaction with the equivalent quantity of a coupling component difficultly soluble at less than 65° C. in the aqueous/acid and aqueous/neutral pH-ranges. More specifically, an aqueous/acid-solution of the diazo component is continuously mixed at a temperature of less than 65° C. within a period of less than 1 minute with the aqueous/alkaline solution of the coupling component and a predetermined pH between 2 and 9 is established by controlling the flow of the mass streams of diazo component and coupling component; in this way a portion of the coupling component is caused to undergo immediate reaction to the azo pigment to be made whereas the balance portion of the coupling component simultaneously commences precipitating as finely crystalline reactive matter, which is reacted in a post-reaction phase with unreacted diazo component to give the azo pigment to be made.

6 Claims, 1 Drawing Sheet

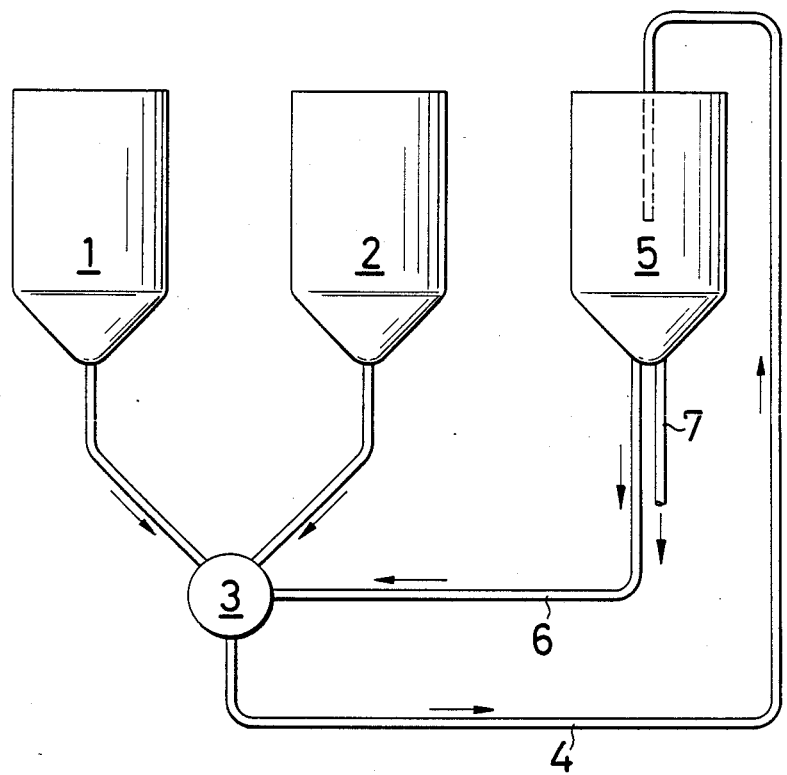

PROCESS FOR MAKING AZO PIGMENTS

The present application is a continuation of application Ser. No. 40,295, filed Apr. 20, 1987, now abandoned.

Azo pigments are made, preferably by subjecting a diazonium compound to an azo coupling reaction with a coupling component, such as an aromatic amine, acetoacetic acid arylide, naphthol, phenol or pyrazolone. This is commonly done by mixing the feed materials in aqueous phase. Reactions of this kind have long been known and described in textbooks of organic chemistry (cf. e.g. Louis and Mary Fieser, Organische Chemie, Verlag Chemie, Weinheim/Bergstrasse, 1965, pages 890 et seq., 1431, 1766 et seq.).

The coupling of components difficultly soluble in an aqueous system raises special problems. To undergo reaction, it is necessary for such coupling components to be distributed as finely as possible. This is done by adding a dispersant, emulsifier or solvent, e.g. an alcohol, or by grinding or precipitating the coupling components which are soluble in strongly alkaline media and can be precipitated by the addition of an acid. The difficult solubility of the coupling component often leads to occlusions in the pigment; as is known, the difficulty of producing pure pigments increases with a decreasing solubility of the pigment in the reaction system.

Normally, the diazonium salt solution stabler in the acid pH-range is allowed to run into the solution or suspension of the coupling component; the acid set free during the azo coupling reaction and the excess acid present in the diazonium salt solution are neutralized by adding a base so as to maintain a predetermined pH. At the feed inlet for the acid diazonium salt solution, there is always a pH-value different from that which establishes after mixing; agitator kind and agitation velocity also influence the formation of by-products and ultimately the colorstic properties of the pigment to be made. In order to avoid side reactions, care is always taken to ensure that the reaction mixture remains free from diazonium compound in excess.

We have now unexpectedly found that pure azo pigments free from occlusions of unreacted coupling component can be reproducibly obtained by rapidly mixing, under certain reaction conditions, equivalent quantities of an aqueous/acid-diazonium salt solution with an aqueous/alkaline solution of a coupling component difficultly soluble in the aqueous/neutral to aqueous/acid pH-range. A difficultly soluble coupling component is one having a solubility of less than 0.1 wgt % at pH 7.

The present invention provides more particularly a process for making azo piments by subjecting a diazo component to an azo coupling reaction with the equivalent quantity of a coupling component difficultly soluble at a temperature lower than 65° C. in the aqueous/acid and aqueous/neutral pH-ranges, which comprises: continuously mixing an aqueous/acid-solution of the diazo component at a temperature of less than 65° C., within a period of less than 1 minute with the aqueous/alkaline solution of the coupling component and establishing a predetermined pH between 2 and 9 by controlling the flow of the mass streams of the diazo component and coupling component and thereby causing a portion of the coupling component to undergo immediate reaction to give the azo pigment to be made and simultaneously causing the balance portion of the coupling component to commence precipitating as finely crystalline reactive matter, and reacting the latter in a post-reaction phase with unreacted diazo component to give the azo pigment to be made.

Further preferred and optional features of the process of this invention provide:

(a) for the continuous mixing operation to be effected over a period of less than 6 seconds;
(b) for the predetermined pH to be established by adding a buffering substance;
(c) for 60 to 98% of the coupling component to undergo immediate reaction to the azo pigment to be made;
(d) for the temperature during the azo coupling reaction including the post-reaction phase to be 10° to 55° C.;
(e) for the precipitated reactive coupling component, depending on its chemical composition, to have an enolate, phenolate or naphtholate group fixed to the surface of its particles.

As already stated, a pH between 2 and 9 is established at the end of the continuous mixing operation the feed materials are subjected to. Establishing an even narrower range depends on the diazo component and coupling component used and is selected specifically for the product to be made. It is however allowable or even obligatory for the pH selected to be the higher within the limits specified, the stabler the diazo component and the lower the solubility of the coupling component in the neutral pH range.

On subjecting the feed materials to the rapid mixing of this invention, a portion of the difficultly soluble coupling component is precipitated as reactive matter which is more reactive than the particles of the pure coupling component. Depending on the chemical nature of the coupling components, the regular finely crystalline particles have a phenolate, enolate or naphtholate group fixed to their surface; these act upon the electron density within the crystalline particles and render them especially reactive. After the equivalent feed components have been mixed together and following the precipitation of a portion of the coupling component in the form of reactive matter, there is an excess of diazonium component heretofore held to be highly undesirable. We have now unexpectedly found however that within the pH and temperature ranges specifically selected in this invention for the less than 1 minute rapid mixing of the feed materials, the diazonium component is substantially not liable to undergo decomposition during a 0.01–1 hour period which is sufficiently long for the precipitated reactive matter fraction of the coupling component to be completely coupled during a post-reaction phase, which varies between 0.01 and 1 hour, depending on the particular product made. It is often advantageous for a portion of the product coming from the mixer to be recycled into it in order to intensify mixing and regulate the residence time of the material in the mixer. It is naturally possible for the product to be recycled via an intermediary container.

Suitable feed materials for making the diazo component are e.g. 2,5-dichloroaniline; 2-chloro-4-nitroaniline; 5-nitro-2-aminoanisole or 3-nitro-4-aminotoluene. The useful coupling components may be selected e.g. from 2-hydroxy-3-naphthoic acid anilide; β-naphthol or acetoacetic acid-o-anisidide.

EXAMPLE 1 (cf. accompanying drawing)

Preparation of 1-(2',5'-dichlorophenylazo-2-hydroxynaphthaline-3-carboxylic acid phenyl amide of the formula

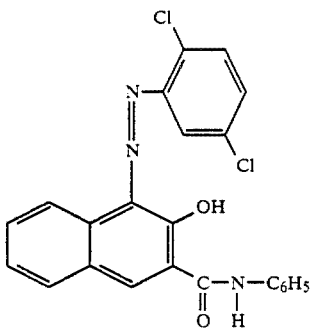

82.5 g (=0.59 mol) 2,5-dichloroaniline of the formula

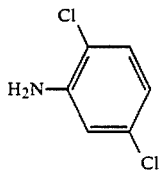

was suspensed in 600 ml water and 175 ml hydrochloric acid (31 wgt %), the suspension was cooled to 2° C. and diazotized with 70 ml sodium nitrite solution (40 wgt %). Next, 35 ml acetic acid (60 wgt %) and 5 g CELITE (this is a registered Trade Mark) (kieselguhr) and active carbon were added as a filter and clarifying aid, and the mixture was filtered at a temperature of less than 10° C. The clear solution of 2,5-dichlorophenyl diazonium chloride buffered with acetic acid was made up with ice and water to 1.8 liter in container (1).

132.5 g (=0.50 mol) 2-hydroxy-3-naphthoic acid anilide of the formula

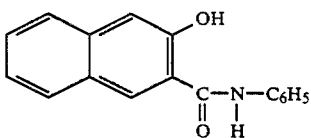

was suspended in 1400 ml water in a second container (2), the suspension was admixed with 154 ml sodium hydroxide solution (25 wgt %), warmed up while stirring until a clear solution was obtained, which was made with water to 1.8 liter and heated to 55° C.

The acid diazonium salt solution of about 2° C. from container (1) and the alkaline coupling component solution of 55° C. from container (2) were introduced jointly within 1 hour at 30° to 40° C. into a mixer (3), taken therefrom through the outlet and conveyed through line (4) into a collecting tank (5) charged with 250 ml water at the onset of operation. At the same time, auxiliary material coming from collecting tank (5) and travelling through recycle line (6) was introduced into mixer (3); a volume of auxiliary material 5 times as large as the volumes of the two feed materials was used. A pH of 4.5 was established in mixer (3) and a pH of 4.2 in collecting tank (5). The residence time in mixer (3) was 1.8 second. The bulk (80%) of the dissolved coupling component underwent spontaneous coupling from the solution to the desired azo pigment whereas the rest of it was found to precipitate as finely crystalline reactive matter; it was coupled in collecting tank (5) which also served as the post-reaction zone with the residual diazonium salt within 30 minutes to desirable azo pigment, during which the diazo component could not be found to undergo undesirable decomposition.

The azo pigment separated from collecting tank (5) through line (7) by filtration was dried (214 g=0.49 mol) and subjected to gas chromatographic analysis; it could not be found to contain detectable occlusions of coupling component.

EXAMPLE 2 (cf. accompanying drawing)

Preparation of 1-(2-chloro-4-nitrophenylazo)-2-naphthol of the formula

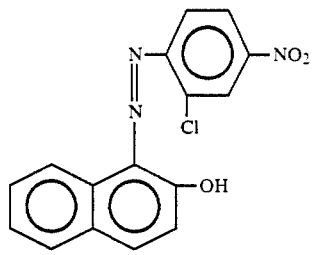

90 g (0.522 mol) 2-chloro-4-nitroaniline was suspended in 500 ml water and 126 ml hydrochloric acid (31 wgt %) and diazotized with 69 ml sodium nitrite solution (40 wgt %) while cooling with ice. Next, 5 g filter aid (Celite, bleaching earth) was added and the batch was filtered; the filter cake was after-washed with ice water and the clear diazonium salt solution was made up to 1500 ml in container (1).

75 g (0.521 mol) β-naphthol was admixed with 500 ml water and 96 ml sodium hydroxide solution (25 wgt %) and the whole was stirred until all was dissolved. Next, the solution was admixed while stirring in container (2) with 10 ml acetic acid (60 wgt %) as a buffering substance and then made up to 1500 ml with ice water.

The acid diazonium salt solution from container (1) and alkaline coupling component solution from container (2) were introduced jointly within 90 minutes at 15°-20° C. into mixer (3), taken therefrom through the outlet and conveyed through line (4) into collecting tank (5) charged with 500 ml water at the onset of operation. At the same time, 200 l/h auxiliary matter from collecting tank (5) was recycled through recycle line (6) into mixer (3).

The pH was 2.6 and the residence time 1.5 second, in mixer (3). The bulk (90%) of the dissolved coupling component was coupled in mixer (3) to the desired azo pigment, whereas the rest of it was found to precipitate as finely crystalline reactive matter; it was after-coupled within 5 minutes in collecting tank (5) which also served as the post-reaction zone, with the residual diazonium salt to give the desired azo pigment.

The azo pigment separated from collecting tank (5) through line (7) by filtration was dried. It weighed 164 g (0.5 mol) and was free from undesirable impurities.

We claim:

1. A process for making azo pigments by subjecting a diazo component to an azo coupling reaction with the equivalent quantity of a coupling component difficultly soluble at less than 65° C. in the aqueous/acid and aqueous/neutral pH-ranges, which comprises: continuously mixing, an aqueous/acid solution of the diazo component at a temperature of less than 65° C., within a period of less than 6 seconds with the aqueous/alkaline solution of the coupling component and with a recycled aqueous suspension of produced azo pigment and establishing a predetermined pH between 2 and 9 by controlling the flow of the mass streams of the diazo component and coupling component and thereby causing a portion of the coupling component to undergo immediate reaction to the azo pigment to be made and simultaneously causing the balance portion of the coupling component to commence precipitating as finely crystalline reactive matter, and reacting the latter in a post-reaction phase with unreacted diazo component to the azo pigment to be made.

2. A process as claimed in claim 1, wherein the coupling component is selected from the group consisting of 2-hydroxy-3-naphthoic acid anilide, β-naphthol, and acetoacetic acid-o-aniside, and the diazo component is selected from the group consisting of 2,5-dichloroaniline, 2-chloro-4-nitroaniline, 5-nitro-2-aminoanisole, and 3-nitro-4-aminotoluene.

3. The process as claimed in claim 1, wherein the predetermined pH is established by adding a buffering substance.

4. The process as claimed in claim 1, wherein 60 to 98% of the coupling component undergoes immediate reaction to the azo pigment to be made.

5. The process as claimed in claim 1, wherein the temperature during the azo coupling reaction including the post-reaction phase is 10° to 55° C.

6. The process as claimed in claim 1, wherein the precipitated reactive coupling component, depending on its chemical composition, has an enolate, phenolate or naphtholate group fixed to the surface of its particles.

* * * * *